US 10,424,991 B2

(12) United States Patent
Yamasaki

(10) Patent No.: US 10,424,991 B2
(45) Date of Patent: Sep. 24, 2019

(54) DRIVE DEVICE

(71) Applicant: DENSO CORPORATION, Kariya, Aichi-pref. (JP)

(72) Inventor: Masashi Yamasaki, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 131 days.

(21) Appl. No.: 14/988,082

(22) Filed: Jan. 5, 2016

(65) Prior Publication Data

US 2016/0204670 A1 Jul. 14, 2016

(30) Foreign Application Priority Data

Jan. 8, 2015 (JP) ................................ 2015-002450

(51) Int. Cl.
*H02K 5/22* (2006.01)
*H02K 11/33* (2016.01)
(Continued)

(52) U.S. Cl.
CPC ......... *H02K 5/225* (2013.01); *H02K 11/0094* (2013.01); *H02K 11/215* (2016.01); *H02K 11/33* (2016.01)

(58) Field of Classification Search
CPC .......... H02K 5/22; H02K 5/225; H02K 11/30; H02K 11/33; H02K 2203/03; H02K 2211/03; H01R 12/58; H01R 12/585; H01R 13/40; H01R 13/422; H01R 13/4223; H01R 13/4226; H01R 13/426; H01R 13/428; H01R 4/28; H01R 4/305; H01R 4/48; H01R 4/4845; H01R 4/4872; H01R 9/092;
(Continued)

(56) References Cited

U.S. PATENT DOCUMENTS 4,773,829 A * 9/1988 Vettori ..................... H02K 7/14
310/68 R
5,131,853 A * 7/1992 Meyer ..................... H01R 4/028
439/82
(Continued)

FOREIGN PATENT DOCUMENTS

JP 2009248864 A * 10/2009 ............... H02K 3/50
JP 2010-123415 6/2010

OTHER PUBLICATIONS

JP 2009248864 A (English Translation).*

*Primary Examiner* — Julio C. Gonzalez
*Assistant Examiner* — Alexander Moraza
(74) *Attorney, Agent, or Firm* — Knobbe, Martens, Olson & Bear, LLP

(57) ABSTRACT

A drive device includes a motor, a substrate arranged perpendicular to a motor shaft on one axial end of the motor and having a conductive connection portion, a frame body reserving a space on a substrate side, a frame member having a substrate pedestal for fixing the substrate, a cover member covering an opposite surface of the substrate relative to the frame member, and a connector having a connector terminal that extends along the axial direction and is press-fitted to the connection portion of the substrate. When the connector terminal of the connector is press-fitted to the substrate and the cover member is disposed at the same time, the number of work steps in an assembly procedure of the drive device is reduced.

16 Claims, 11 Drawing Sheets

(51) Int. Cl.
*H02K 11/00* (2016.01)
*H02K 11/215* (2016.01)

(58) Field of Classification Search
CPC ........... H05K 2201/1059; H05K 3/306; H05K 3/308; H05K 3/3415; H05K 3/3447
USPC ................................. 310/71, 68 R–68 E, 89
See application file for complete search history.

(56) References Cited

U.S. PATENT DOCUMENTS

| | | | |
|---|---|---|---|
| 2004/0232873 A1* | 11/2004 | Heizmann | G01P 3/4802 318/653 |
| 2007/0205038 A1* | 9/2007 | Tominaga | B62D 5/0406 180/444 |
| 2009/0241538 A1 | 10/2009 | Yoshinaga et al. | |
| 2012/0307476 A1 | 12/2012 | Masuzawa et al. | |
| 2014/0225482 A1* | 8/2014 | Hara | H02K 5/22 310/68 D |
| 2015/0216083 A1* | 7/2015 | Kanazawa | H02K 7/116 310/52 |
| 2015/0333600 A1 | 11/2015 | Nakano et al. | |
| 2016/0185232 A1* | 6/2016 | Suzuki | B60L 1/003 318/34 |
| 2016/0347354 A1* | 12/2016 | Asao | B62D 5/0406 |
| 2017/0207685 A1* | 7/2017 | Ushio | H01R 13/405 |

\* cited by examiner

DRIVE DEVICE

CROSS REFERENCE TO RELATED APPLICATION

The present application is based on and claims the benefit of priority of Japanese Patent Application No. 2015-002450, filed on Jan. 8, 2015, the disclosure of which is incorporated herein by reference.

TECHNICAL FIELD

The present disclosure generally relates to a drive device having a motor and a controller.

BACKGROUND INFORMATION

Conventionally, the drive device is made up of a combination of a motor and a controller controlling the motor (i.e., a control of a power supply to the motor). In such a drive device, the connector terminal of a connector that connects wiring to the motor for the supply of the electric power as well as supplying signals to the substrate in the controller is soldered onto the substrate.

The drive device described in a patent document, Japanese Patent Laid-Open No. 2012-245915 (patent document 1) or the like has a cover member for protecting the substrate. The cover member covers (i.e., shields) the connection portion of the connector terminal and the substrate from the outside of the motor, meaning that the connection portion is invisible from the outside due to the cover member. Therefore, the steps of manufacturing the drive device disclosed in the patent document 1 may be increased, because the cover member may be disposed on the drive device only after the soldering of the connector terminal onto the substrate.

SUMMARY

It is an object of the present disclosure to provide a drive device that is manufactured with a fewer work steps in comparison to the conventional drive device.

In an aspect of the present disclosure, the drive device includes a motor having a stator on which a winding is wound, a rotor rotatable relative to the stator, and a shaft rotatable together with the rotor. The drive device also includes a substrate disposed on one axial end part of the motor perpendicular to an axial direction of the motor, and having electronic components, and at least one conductive connection portion disposed on the substrate to control a power supply to the winding. The drive device further includes a frame member having a frame body that is disposed at a position between the motor and the substrate with a gap interposed in between the frame body and the substrate, and a substrate pedestal protruding from the frame body toward the substrate on which the substrate is fixedly disposed. The drive device also includes a cover member disposed to cover an opposite surface of the substrate relative to a frame member facing surface of the substrate, the cover member having an outer periphery extending along the axial direction and being connected to the frame body. The drive device further includes a connector disposed on the cover member for a connection to an external device, and having at least one connector terminal that extends along the axial direction and has a press-fit connection to the at least one conductive connection portion.

In the above-mentioned configuration, the cover member is disposed to "bind" the substrate together with the frame member, and both the outer periphery of the cover member and the connector terminal of the connector extend along the axial direction toward the substrate.

Therefore, when the drive device of the present disclosure is manufactured, the cover member having the connector is assembled by moving the cover member closer to the substrate along the axial direction, which automatically combines the outer periphery of the cover member to the frame member, and press-fitting the connector terminal to the connection portion.

The substrate is, as described above, fixedly disposed on the substrate pedestal that protrudes from the frame body, the frame body and the substrate are separated by a vacant space in between. Therefore, even when the connector terminal pieces the substrate in the course of press-fitting to the connection portion, the connector terminal does not interfere with the frame body.

Therefore, according to the present disclosure, even when the cover member shields the connection portion between the substrate and the connector terminal from the outside (i.e., even when the connection portion is invisible from the outside), the drive device is assembled with ease, thereby reducing the number of work steps in the assembly procedure of the drive device.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Hereafter, the drive device of the present disclosure is described based on the drawings. In the following embodiments, the like parts have the like numbers, and the description of the same parts is not repeated.

(First Embodiment)

The drive device in the first embodiment of the present disclosure is applied to an electric power steering device of the vehicle. The electric power steering device transmits a steering assist torque that is output from the drive device to a column or a rack via a speed reduction gear, and assists a steering operation by the driver of the vehicle.

Figure 13:
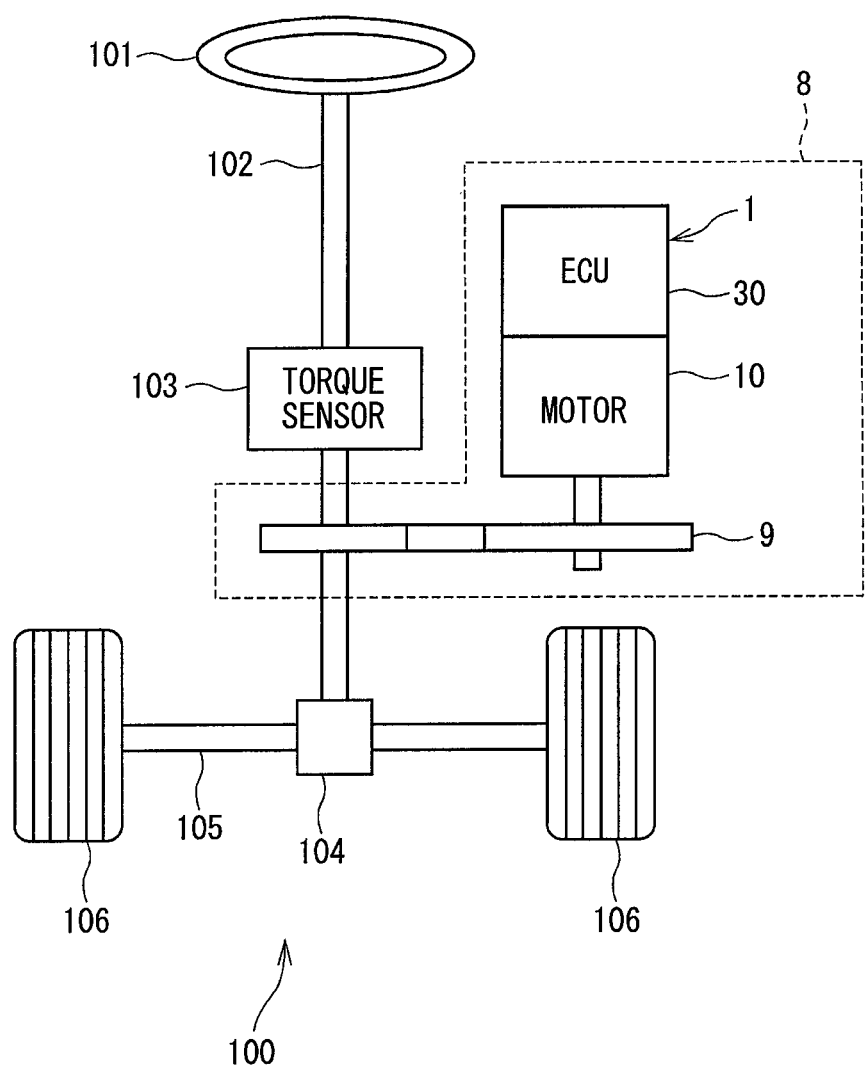
FIG. 13 is a schematic diagram of a steering system containing an electric power steering device.

FIG. 13 shows an entire configuration of a steering system 100 provided with an electric power steering device 8. The steering system 100 comprises a steering wheel 101, a column shaft 102, a pinion gear 104, a rack shaft 105, a tire 106, the electric power steering device 8, and the like as a steering component.

The steering wheel 101 is connected to the column shaft 102. A torque sensor 103 is disposed on the column shaft 102 to detect a steering torque by the driver operation of the steering wheel 101. The pinion gear 104 is formed at the tip of the column shaft 102, and the pinion gear 104 is engaged with the rack shaft 105. A pair of tires 106 is disposed on both ends of the rack shaft 105 via a tie rod or the like.

Thereby, when the driver rotates the steering wheel 101, the column shaft 102 connected to the steering wheel 101 also rotates. The rotational movement of the column shaft 102 is converted to the translational movement of the rack shaft 105 by the pinion gear 104, and the pair of tires 106 is steered by an angle according to the amount of displacement of the rack shaft 105.

The electric power steering apparatus 8 is provided with a speed reduction gear 9 and the drive device 1.

The drive device 1 includes a motor 10 and a controller 30 (e.g., designated as an Electronic Control Unit (ECU) in FIG. 13), which is required for the control of the motor 10. The motor 10 and the controller 30 are combined to have one body.

The electric power steering apparatus 8 outputs an assist torque from the motor for assisting a steering of the steering wheel 101 based on the steering torque obtained from a torque sensor 103, and signals from a Control Area Network (CAN) (not illustrated) regarding the vehicle speed or the like. The electric power steering apparatus 8 then transmits the torque to the column shaft 102 via the speed reduction gear 9.

(Drive Device)

Figure 5:
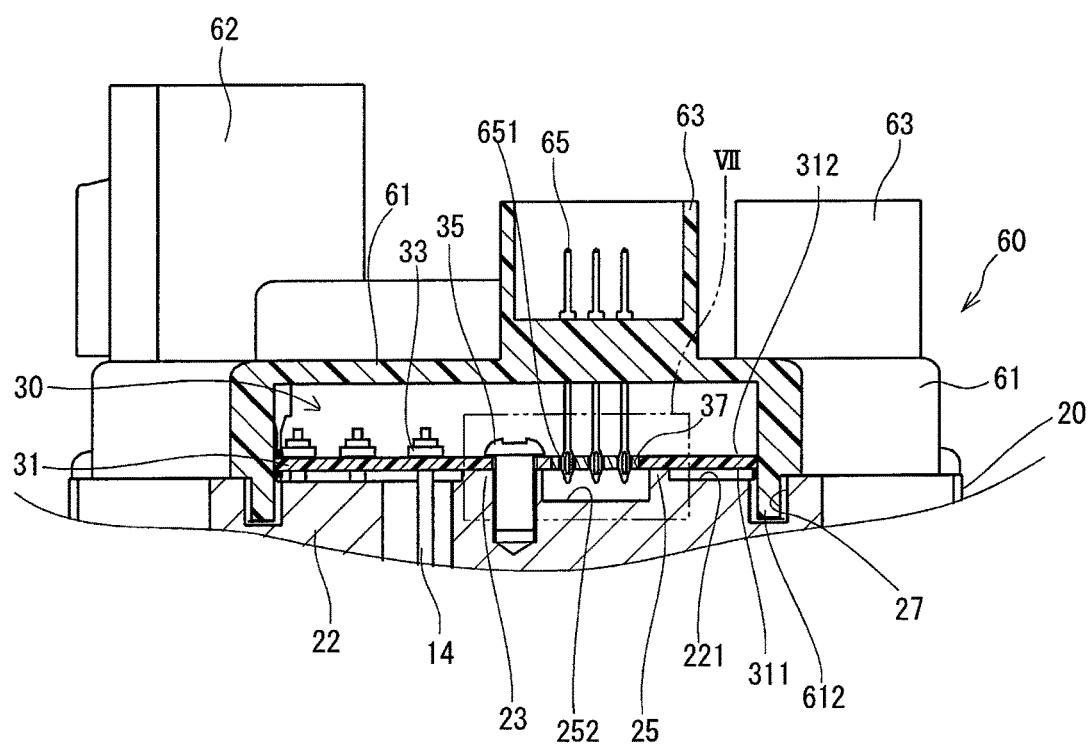
FIG. 5 is a cross-sectional view of a cover member along an arrow V in FIG. 4.

The configuration of the drive device 1 is described with reference to FIGS. 1 to 5. In FIG. 5, a part of the configuration is omitted from the drawing for the ease of reading the drawing.

The drive device 1 is provided with the motor 10, a frame member 20, the controller 30, a cover member 60 and the like, and these components are combined in one body. In the following, the axial direction of the motor 10 may simply be referred to as an "axial direction," and the radius direction of the motor 10 may simply be referred to as a "radius direction."

The motor 10 is a three-phase alternative current electric motor, for example, and is provided with a motor case 11, a stator 12, two systems of winding wire groups 13, a rotor 15, a shaft 16 and the like.

The motor case 11 is formed in a cylinder shape having a bottom, for example, with metal (e.g. aluminum), and includes a cylinder part 111 and a bottom 112 that is disposed on an opposite end of the cylinder part 111 relative to the controller 30. A shaft hole 113 is bored substantially at the center of the bottom 112, and a bearing 166 is provided in the shaft hole 113.

In the present embodiment, the frame member 20 functions as a case of the motor 10 together with the motor case 11. The frame member 20 is made with, for example, a thermally conductive metal (e.g. aluminum), and is arranged to cover an opening of the motor case 11. A shaft hole 21 is bored substantially at the center of the frame member 20, and a bearing 167 is provided in the shaft hole 21. Further, a motor line insertion hole 202 is bored on the frame member 20.

The motor case 11 and the frame member 20 respectively have a plurality of fixing parts 115 and 29 that project outwardly along the radius of the motor 10, in a one-to-one corresponding manner. A screw hole 116 is bored on the fixing part 115, and a through hole 291 is bored on a fixing part 29.

When a screw 19 is inserted into the through hole 291 and is screwed into the screw hole 116, the motor case 11 and the frame member 20 are fixedly combined with each other.

The stator 12 is fixedly disposed in an inside of the motor case 11, on which two systems of the winding wire groups 13 are wound. Each of the winding wire groups 13 forms a coil of the three-phase circuit, and a motor line 14 extends from the coil of each phase. The motor line 14 is taken out through the motor line insertion hole 202 of the frame member 20 toward the controller 30.

The rotor 15 is disposed in an inside of the radius direction relative to the stator 12, and is coaxially positioned with the stator 12.

The shaft 16 is fixedly disposed at an axial center of the rotor 15. Further, the shaft 16 is rotatably disposed with a support of the bearing 166 on the bottom 112 of the motor case 11 and the bearing 167 on the frame member 20.

One end 161 of the shaft 16 is inserted into the shaft hole 113 on the bottom 112 of the motor case 11, and protrudes to an outside of the motor case 11. An output end (not illustrated) of the shaft 16, which is connected to a speed reduction gear of the electric power steering apparatus 8, is provided on the one end 161 of the shaft 16.

A magnet 18 is held in a holder member 17 that is disposed on an other end 162 of the shaft 16. When the other end 162 of the shaft 16 is inserted into the shaft hole 21 of the frame member 20, the magnet 18 faces the controller 30.

The frame member 20 of the present embodiment has, in one body, not only a frame body 22 arranged to cover the opening of the motor case 11 but also a substrate pedestal 23 as well as substrate supporters 24, 25.

The substrate pedestal 23 protrudes toward the substrate 31 from a substrate facing surface 221 of the frame body 22 facing the substrate 31 of the controller 30 to be mentioned below. A protruding end face of the substrate pedestal 23 supports the substrate 31, and the substrate 31 is held at a height of the protrusion of the substrate pedestal 23 above the frame body 22 (i.e., a space is reserved in between the substrate 31 and the frame body 22). The substrate 31 is fixed to the substrate pedestal 23, for example, by the screw thread. According to the present embodiment, a hole part 316 is formed corresponding to the substrate pedestal 23, and a screw 35 inserted in the hole part 316 is screwed on the substrate pedestal 23.

(Detailed Description of the Substrate Supporters 24 and 25)

The controller 30 is provided with the substrate 31 on which various kinds of electronic components 41 to 48 are mounted.

The substrate 31 is a printed circuit board, for example, and is substantially perpendicularly positioned relative to the axial direction of the motor 10 to face the frame member 20.

One of the two main surfaces of the substrate 31 is designated as a first main surface 311, which is facing the frame member 20, and the other one of the two main faces of the substrate 31, facing away from the frame member 20, is designated as a second main surface 312.

The first main surface 311 of the substrate 31 has, mounted on the first surface 311, a plurality of switching elements 41 (e.g., Metal-Oxide-Semiconductor Field-Effect Transistor (MOSFET)) serving as two inverters that respectively correspond to two systems of the winding wire groups 13, a power relay 42 for shutting and connecting a power supply from a power source to the inverter, a reverse connection protection relay 43, and a sensor 44 for detecting a position of the rotor 15, and an integrated circuit 45 for outputting a driving signal based on an instruction value to the switching element 41, together with other parts. Among these components, large size components such as the power relay 42 and the integrated circuit 45, which have larger volumes than other components, are accommodated in chamber houses 281 and 282 formed on the substrate facing surface 221 of the frame member 20.

The sensor 44 faces the magnet 18 held on the other end 162 of the shaft 16. The switching element 41, the power relay 42, the reverse connection protection relay 43, and the integrated circuit 45 respectively contact the frame member 20 via a heat dissipation gel (not illustrated) in a heat-dissipatable manner. That is, the frame member 20 of the present embodiment functions as a heat sink.

The second main surface 312 of the substrate 31 has, mounted on the second main surface 312, a microcomputer 46 that calculates an instruction value about the electric power supplied to each of the winding wire groups 13 based on the position of the rotor 15 or the like, a capacitor 47 that assists the electric power supply to the inverter by storing the electric charge, a choke coil 48 that serves as a filter circuit together with the capacitor 47 for reducing the noise, and the like.

In the present embodiment, various kinds of electronic components 41 to 48 are mounted on one substrate 31. In such manner, the size of the controller 30 is reduced, while reducing the number of the components, in comparison to the case in which plural substrates are used.

Figure 1:
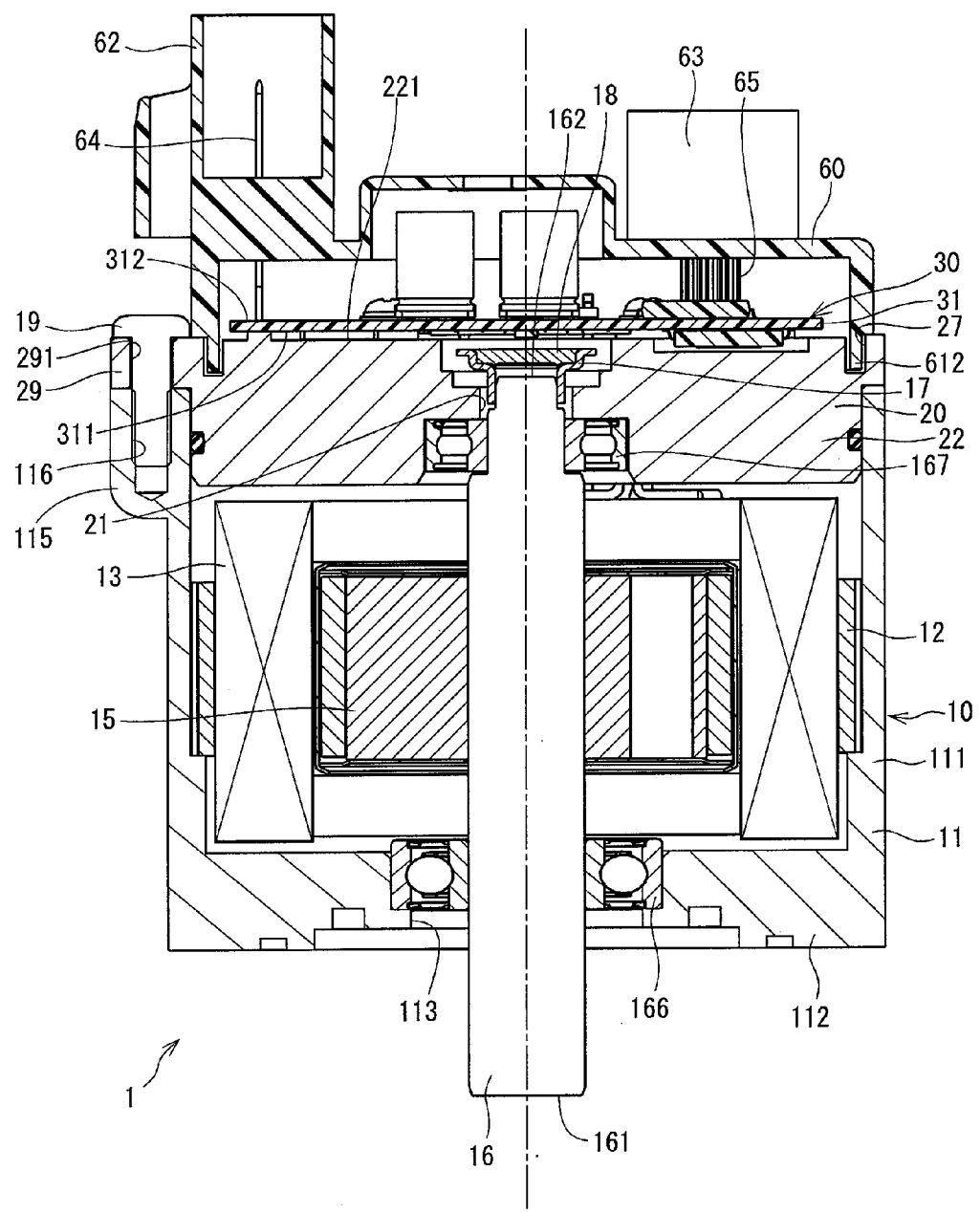
FIG. 1 is a cross-sectional view of a drive device in the first embodiment of the present disclosure.
Figure 2:
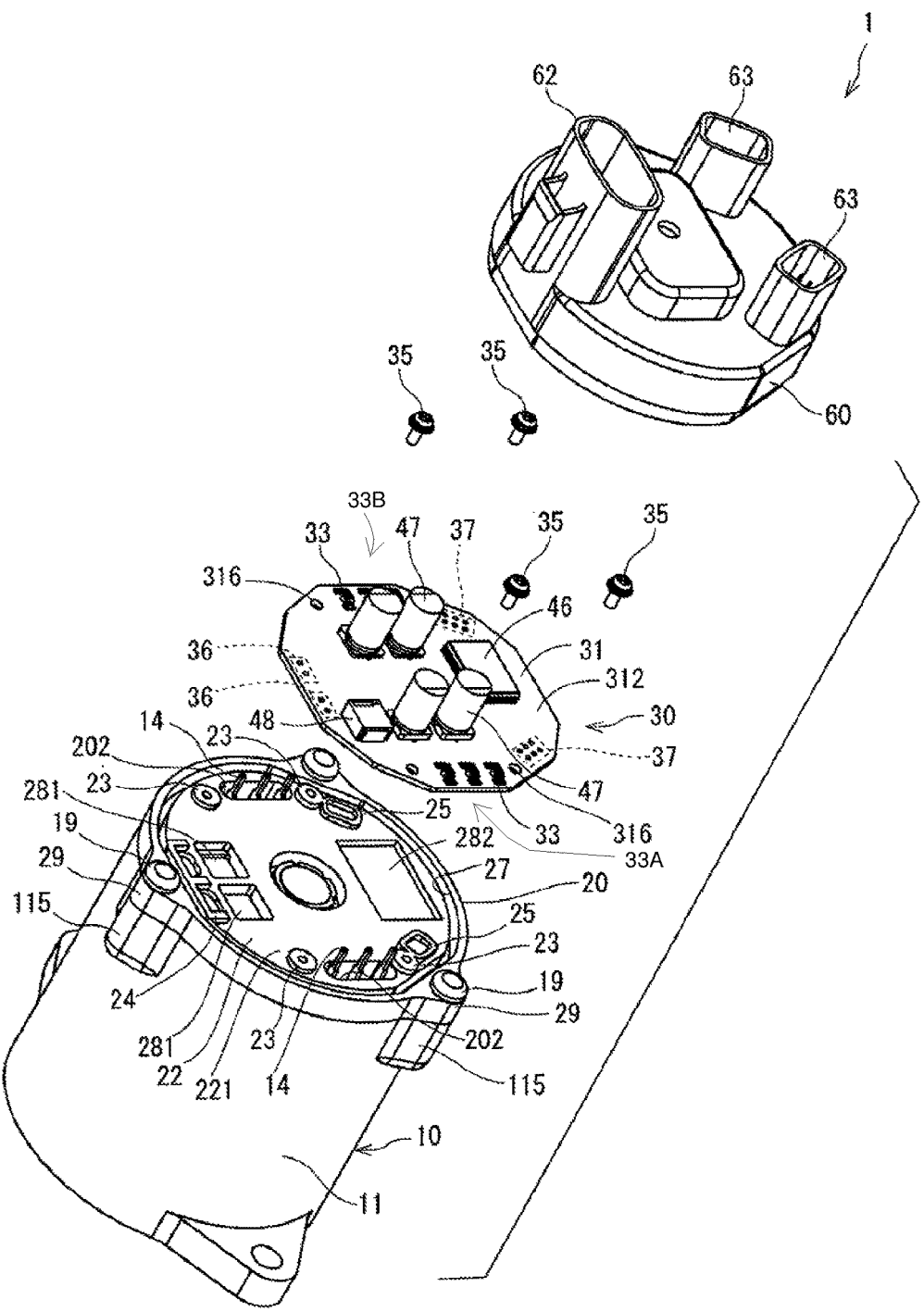
FIG. 2 is an exploded perspective view of the drive device in the first embodiment of the present disclosure.
Figure 3:
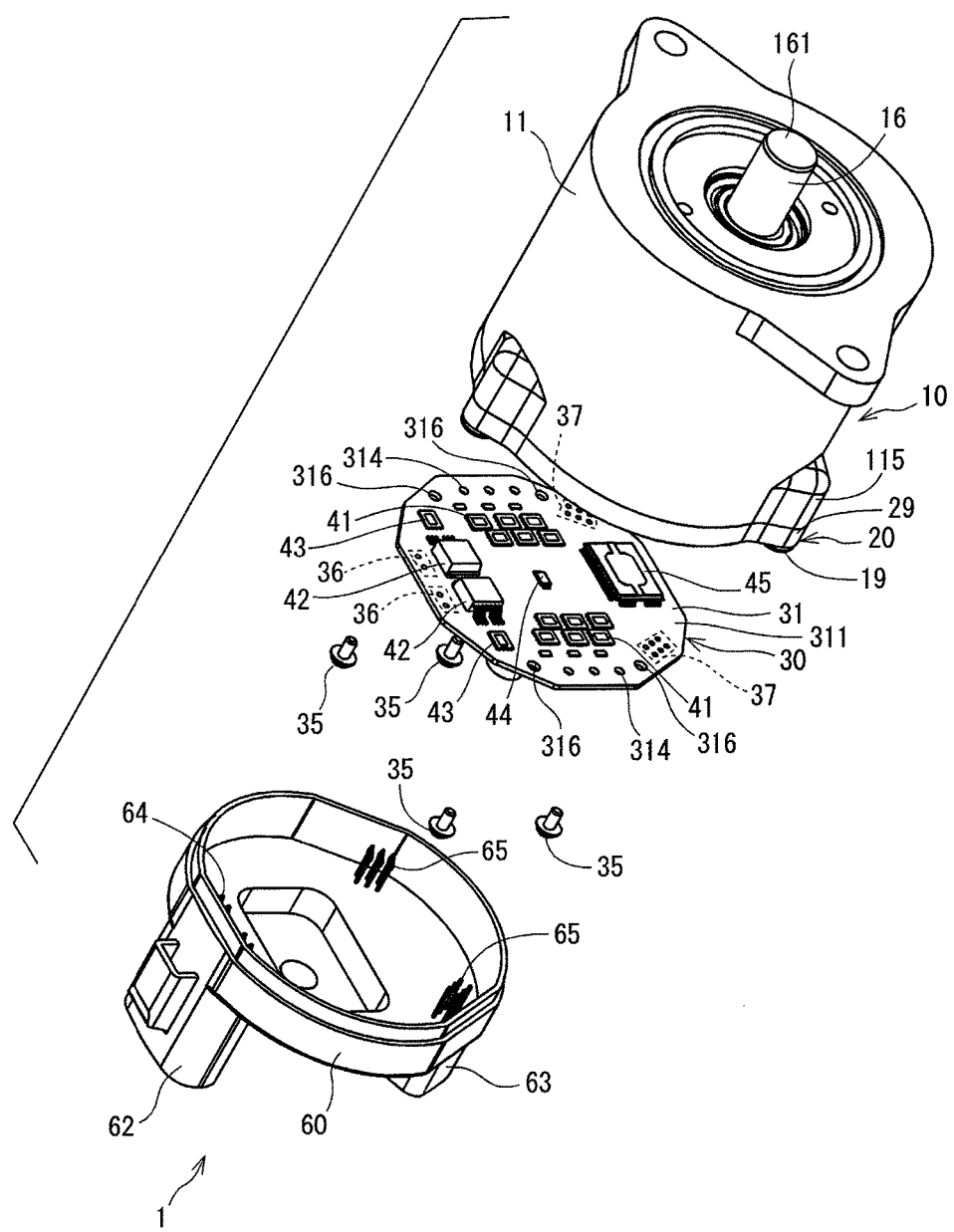
FIG. 3 is another exploded perspective view of the drive device in the first embodiment of the present disclosure.
Figure 4:
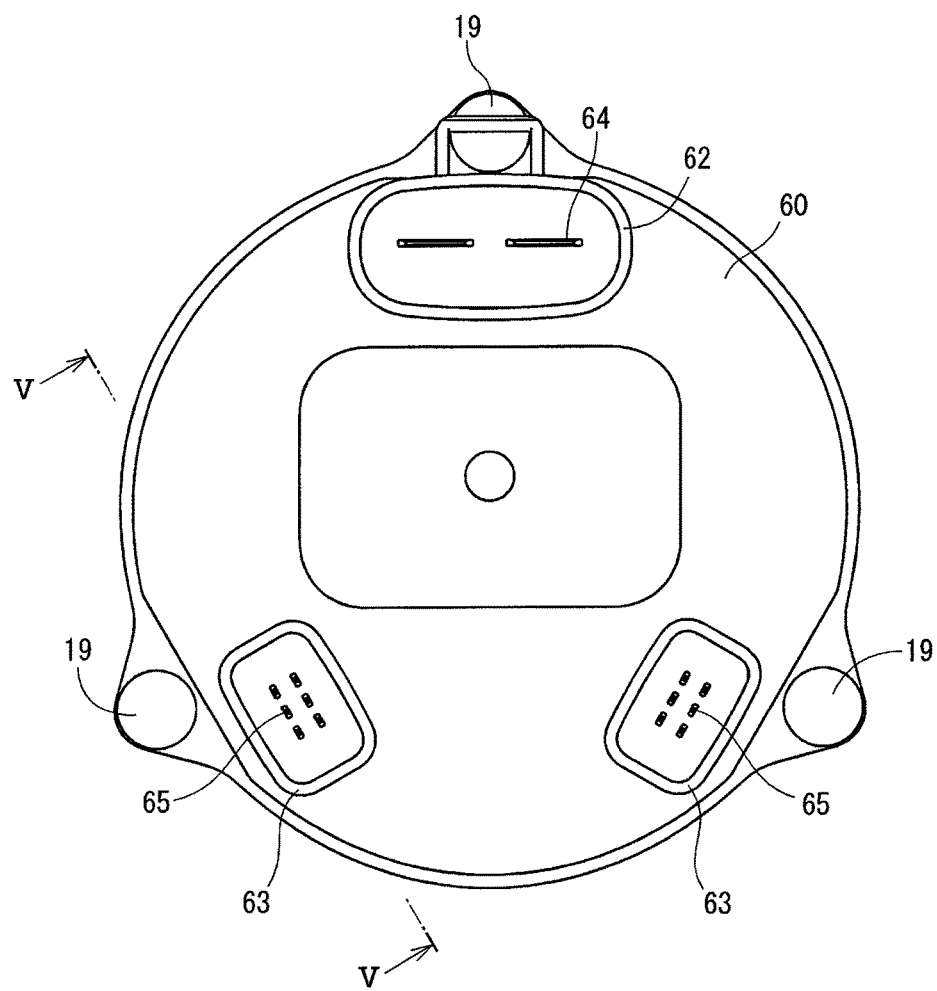
FIG. 4 is a plan view of the drive device in the first embodiment of the present disclosure.

A motor line insertion hole 314 is bored on the substrate 31 at a position corresponding to the motor line 14 extending toward the controller 30. Further, the second main surface 312 of the substrate 31 has a connection terminal 33 that corresponds to the motor line insertion hole 314. The motor line 14 is inserted into the hole 314, and is press-fitted to the terminal 33 for establishing an electrical connection to the substrate. As described above, the motor 10 of the drive device 1 has two winding wire groups 13, with a motor line 14 extending from a coil of each of the three phases in each of the winding wire groups 13. In FIG. 2, three motor lines extend through the motor line insertion holes 202 on each side of the frame member 20. As shown in FIGS. 2, and 3 two groups of motor line insertion holes 314 and connection terminals 33 for each winding wire group 13 are disposed at two different connection positions 33A and 33B on the substrate 31, where the connection positions 33A, 33B on the substrate 31 correspond to the positions of the motor lines 14 and motor line insertion holes 202. Although FIG. 2 shows and exploded view if the drive device 1, the connection positions 33A, 33B on the substrate 31 overlie the positions of the winding groups 13 of stator 12, the motor line insertion holes 202, and the motor lines 14 when the drive device 1 is assembled. As shown in FIG. 2, one group of connection terminals 33 is disposed are first connection position 33A on the substrate 31 near an edge or periphery of the substrate 31. On the same surface of the substrate 31, another group of connection terminals 33 is disposed at a second connection position 33B on an opposite edge or periphery of the substrate 31 (i.e., the edge/periphery opposite to the first position). As shown in FIG 2, the first 33A and second 33B connection positions of the connection terminals 33 are positioned on the same surface of the substrate 31, but disposed on opposing or opposite sides of the substrate 31. In FIG. 2, there are three connection terminals 33 at the first connection position 33A and three connection terminals 33 at the second connection position 33B.

A cover member 60 is arranged to cover the substrate 31 (i.e., to cover a one surface of the substrate 31 facing away from the frame member 20), and has an outer periphery 612 that extends along the axial direction toward the frame member 20. The outer periphery 612 is inserted in a groove 27 formed on the substrate facing surface 221 of the frame member 20, and is fixed by adhesives, etc. The cover member 60 protects the controller 30 from an external shock, or prevents permeation of dust and/or water into the controller 30.

A power supply connector 62 protrudes from the cover member 60 in a direction away from the motor 10, and is connectable to a non-illustrated wire harness which is connected to the battery.

The power supply connector 62 has a power supply connector terminal 64. The power supply connector 62 of the present embodiment has two connector terminals 64 respectively for the positive and negative terminals, amounting to four terminals 64 in total. The power supply connector terminal 64 is press-fitted to a power supply connection portion 36 which is mentioned later.

Two signal connectors 63 protrude away from the motor 10 on the cover member 60, among which one connector 63 is connectable to a harness that leads to the torque sensor, and the other connector 63 is connectable to a harness that leads to CAN.

The signal connector 63 has a signal connector terminal 65. The signal connector 63 of the present embodiment has six signal connector terminals 65. The signal connector terminal 65 is press-fitted to a signal connection portion 37, which is mentioned later.

The power supply connector 62 and two signal connectors 63 of the present embodiment are formed to have one body with the cover member 60, which is made with resin or the like. In other words, the cover member 60 has the power supply connector terminal 64 and the signal connector terminal 65 formed on the cover member 60.

(Press-fit Terminal)

Figure 6:
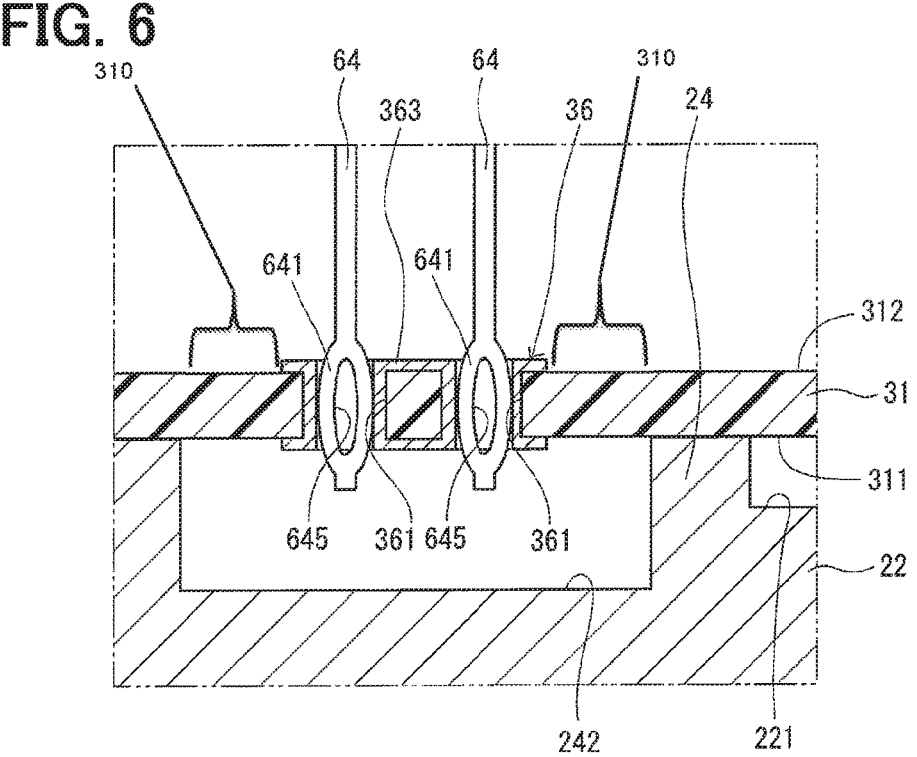
FIG. 6 is a cross-sectional view of a power supply connector terminal and its surrounding in the first embodiment of the present disclosure.
Figure 7:
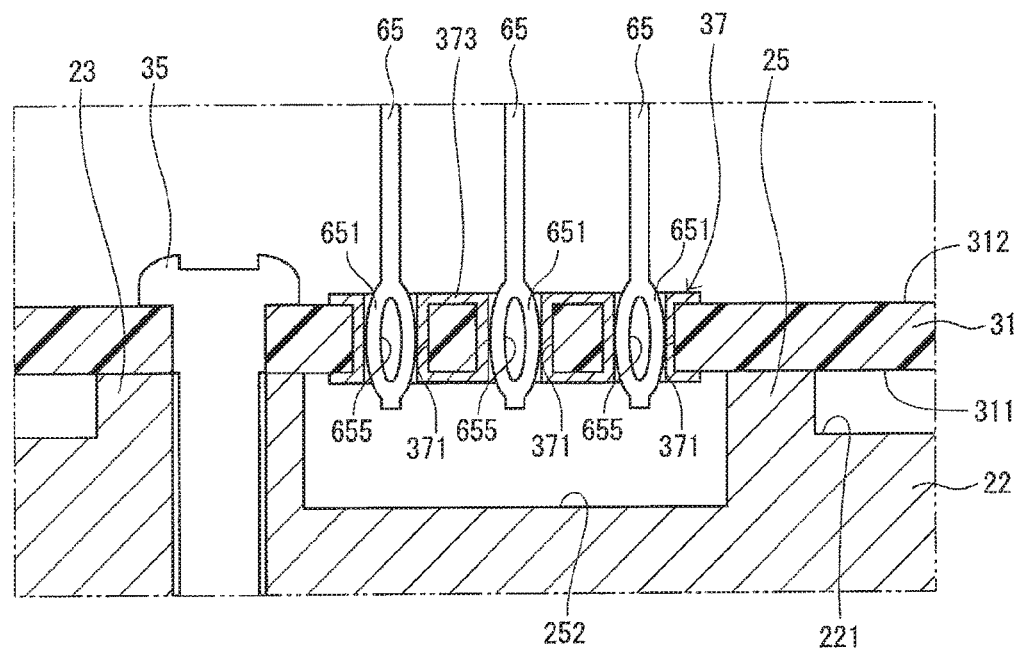
FIG. 7 is an enlarged view of a signal connector terminal and its surrounding in an area VII in FIG. 5.

The configuration of the power supply connector terminal 64 and the signal connector terminal 65 is described with reference to FIGS. 6 and 7. FIG. 6 is a cross-sectional view of the power supply connector terminal 64, and FIG. 7 is a cross-sectional view of the signal connector terminal 65.

As shown in FIG. 6, the power supply connector terminal 64 extends along the axial direction toward the substrate 31. An end part 641 of the terminal 64 is elastically deformable by having a through hole 645 bored on the end part 641 for the connection to the substrate 31. That is, the power supply connector terminal 64 is a press-fit terminal.

As shown in FIG. 6, corresponding to the power supply connector 62, the power supply connection portion 36 (also known as a "connection portion"), to which a press-fit connection of the power supply connector terminal 64 is established, is provided on the substrate 31.

The power supply connection portion 36 has a conductive layer 363 that covers an inner surface of a through hole 361 bored for accepting the power supply connector terminal 64. The power supply connector terminal 64 elastically contacts the conductive layer 363 when inserted into the through hole 361, thereby establishing an electrical connection to the substrate 31.

In the present embodiment, one power supply connection portion 36 is provided respectively for the positive and negative terminals, thereby having two holes 361 in one connection portion 36.

On the other hand, as shown in FIG. 7, the signal connector terminal 65 extends along the axial direction toward the substrate 31. An end part 651 of the terminal 65 is elastically deformable by having a through hole 655 bored thereon for the connection to the substrate 31. That is, the signal connector terminal 65 is also a press-fit terminal.

As shown in FIG. 7, corresponding to the signal connector 63, the signal connection portion 37 (also known as a "connection portion"), to which a press-fit connection of the signal connector terminal 65 is established, is provided on the substrate 31.

The signal connection portion 37 has a conductive layer 373, which covers an inner surface of a through hole 371 bored for accepting the signal connector terminal 65. The signal connector terminal 65 elastically contacts the conductive layer 373 when inserted into the through hole 371, thereby establishing an electrical connection to the substrate 31.

In the present embodiment, the signal connection portion 37 has six through holes 371.

(Substrate Supporter)

Figure 8:
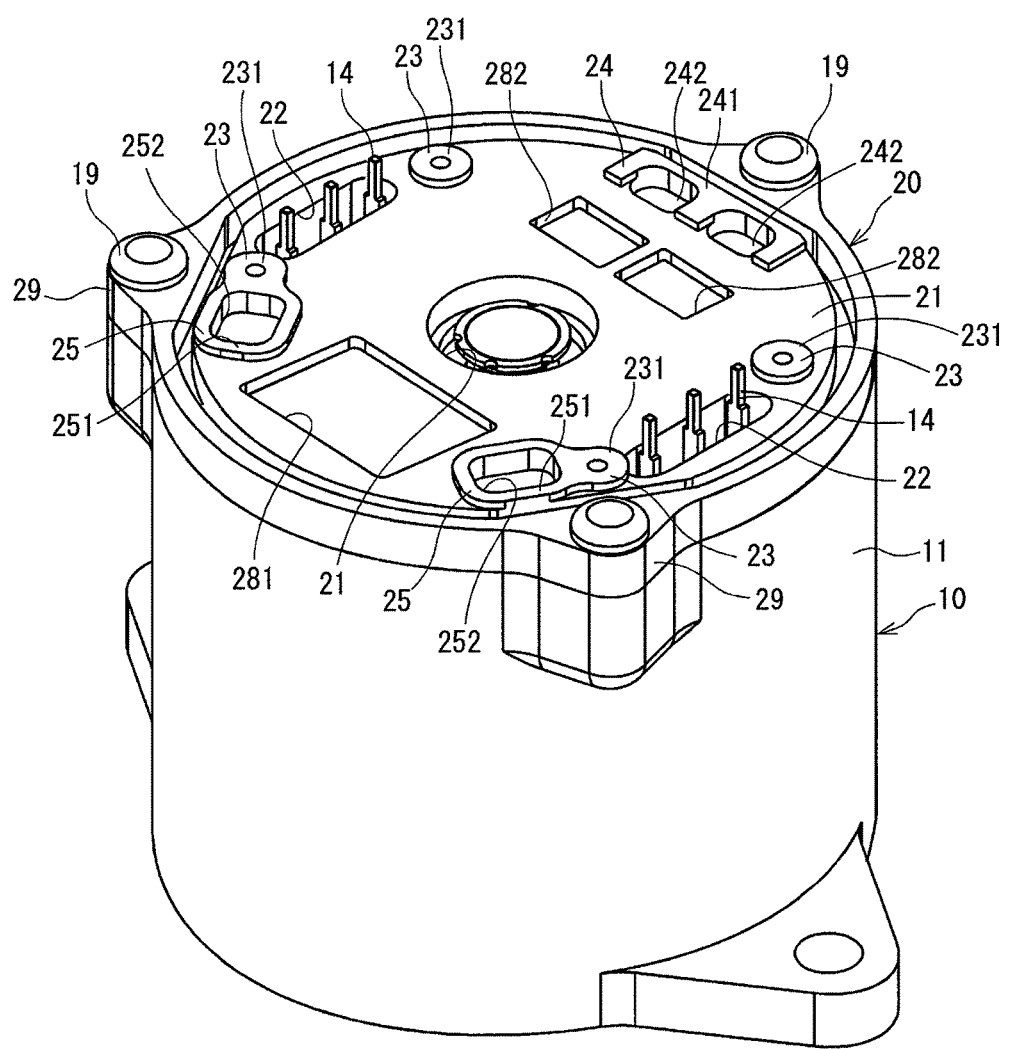
FIG. 8 is a perspective view of a controller and a cover member of the drive device in the first embodiment of the present disclosure.
Figure 9:
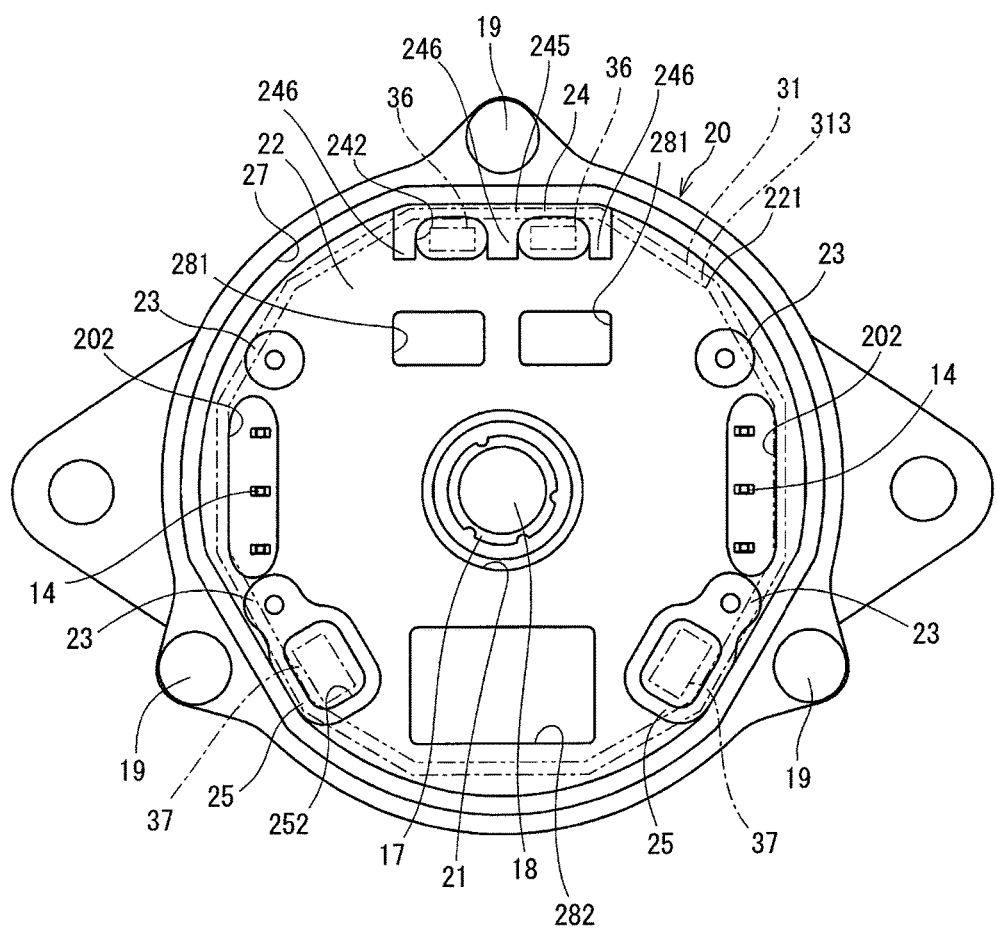
FIG. 9 is a plan view of FIG. 8 see from the above.

Next, the substrate supporters 24 and 25 of the frame member 20 are described with reference to FIGS. 8 and 9. In FIGS. 8 and 9, the controller 30 and the cover member 60 are omitted from the illustration.

Further, in FIG. 9, the position of the substrate 31, the power supply connection portion 36 on the substrate 31, and the signal connection portion 37 on the substrate 31 are shown by a one-dot long dashed line.

The substrate supporters 24 and 25 protrude from the substrate facing surface 221 of the frame body 22 toward the substrate 31. The protrusion height of the substrate supporters 24 and 25 is the same as that of the substrate pedestal 23. That is, a protruding end faces 241 and 251 of the substrate supporters 24 and 25 are on the same plane as a protruding end face 231 of the substrate pedestal 23.

The substrate supporter 24, among the substrate supporters 24 and 25, is positioned to correspond to the power supply connection portion 36 of the substrate 31, and the substrate supporter 25 is positioned to correspond to the signal connection portion 37 of the substrate 31.

The substrate supporter 24 supports a proximity of the power supply connection portion 36 of the substrate 31. The "proximity" of the power supply connection portion 36 means an area within which a reaction force of insertion of the power supply connector terminal 64 influences on the substrate 31, and a gap from the connection portion 36 is reserved for an electrical insulation.

The substrate supporter 24 has a bottom part 245 arranged on one side of the power supply connection portion 36, and a plurality of side parts 246 arranged on different sides (i.e., sides that bind the connection portion 36 in between the plurality of side parts 246 in a view along the axial direction (refer to FIG. 9).

In other words, the substrate supporter 24 has a flat-bottom groove shape in which the power supply connection portion 36 is positioned, when seen from the axial direction.

In an inside of the substrate supporter 24 on the frame member 20 (i.e., at a position directly under the power supply connection portion 36), a concavity 242 is formed. The end of the power supply connector terminal 64 press-fitted to the power supply connection portion 36 is accommodated in the concavity 242.

On the other hand, the substrate supporter 25 supports the proximity of the signal connection portion 37 on the substrate 31.

The "proximity" of the signal connection portion 37 means an area within which a reaction force of insertion of the signal connection the signal connector terminal 65 influences on the substrate 31, and a gap from the connection portion 37 is reserved for an electrical insulation.

When the substrate supporter 25 is seen from the axial direction, the substrate supporter 25 has a circle shape that circles around an entire circumference of the signal connection portion 37.

Although the substrate supporter 25 of the present embodiment is formed in one body with a part of the substrate pedestal 23, the substrate supporter 25 may be separately formed from the substrate pedestal 23.

In an inside of the substrate supporter 25 on the frame member 20 (i.e., at a position directly under the signal connection portion 37), a concavity 252 is formed. The end of the signal connector terminal 65 press-fitted in the signal connection portion 37 is accommodated in the concavity 252.

Here, the substrate 31 of the present embodiment has an edge part 313 on which positioning a copper foil, or a copper wiring, is difficult to be disposed. In FIG. 9, the edge part 313 of the substrate 31 is shown by a two-dot dash line.

The substrate supporters 24 and 25 contact the edge part 313 of the substrate 31. For example, the substrate supporter 24 contacts the edge part 313 of the substrate 31 by the bottom part 245. Further, the substrate supporter 25 contacts the edge part 313 of the substrate 31 by a longer side of substantially rectangular ring shape.

(Effects of the Present Embodiment)

Hereafter, the power supply connection portion 36 and the signal connection portion 37 are designated simply as the connection portions 36 and 37, and the power supply connector 62 and the signal connector 63 are simply designated as the connectors 62 and 63, and the power supply connector terminal 64 and the signal connector terminal 65 are simply designated as connector terminals 64 and 65.

(1) As mentioned above, the drive device 1 of the present embodiment is provided with the motor 10, the substrate 31, the frame member 20, the cover member 60, and the connectors 62 and 63.

The motor 10 has the stator 12 on which the winding wire group 13 is wound, and the rotor 15 that is rotatably disposed relative to the stator 12, and the shaft 16 that rotates together with the rotor 15.

The substrate 31 is perpendicularly disposed on one axial end part of the motor 10, and includes the electronic components 41 to 48 and the conductive connection portions 36 and 37, which are disposed on the substrate 31 for the control of the power supply to the winding wire group 13.

The frame member 20 includes the frame body 22, which reserves a gap space to the substrate at a position between the motor 10 and the substrate 31, and the substrate pedestal 23 that protrudes from the frame body 22 toward the substrate 31 on which the substrate 31 is fixed.

The cover member 60 is disposed to cover an opposite surface of the substrate 31 relative to the frame member facing surface, and has the outer periphery 612 extending along the axial direction and being connected to the frame member 20.

The connectors 62 and 63 are formed on the cover member 60, and are connectable to an external device. The connectors 62 and 63 include the connector terminals 64 and 65 that extend along the axial direction, and are press-fitted to the connection portions 36 and 37 of the substrate 31.

According to the above-mentioned configuration, the cover member 60 binds the substrate 31 with the frame member 20, and the outer periphery 612 of the cover member 60 and the connector terminals 64 and 65 of the connectors 62 and 63 extend in the same direction along the axial direction toward the substrate 31.

Therefore, when manufacturing the drive device 1, by moving the cover member 60 closer along the axial direction to the frame member 20 on which the substrate 31 is fixed, the outer periphery 612 of the cover member 60 is joined to the frame member 20 by establishing a press-fit connection of the connector terminals 64 and 65 to the connection portions 36 and 37.

Here, since the substrate 31 is fixed on the substrate pedestal 23 protruding from the frame body 22, a space is reserved between the frame body 22 and the substrate 31. Therefore, when the press-fit connection of the connector terminals 64 and 65 is established to the connection portions 36 and 37, even when the connector terminals 64 and 65 pierce the substrate 31, it will not interfere with the frame body 22.

Therefore, according to the present embodiment, the connection portion of the substrate 31 and the connector terminals 64 and 65 are shielded by the cover member 60 from a view from an outside (e.g., from a worker's view), and the drive device 1 is easily assembled with a reduced number of work steps.

(2) In the drive device 1 of the present embodiment, when a press-fit connection of the connector terminals 64 and 65 is established to the connection portions 36 and 37 of the substrate 31, the reaction force is generated around the connection portions 36 and 37 on the substrate 31, according to an insertion load of the connector terminals 64 and 65.

The frame member 20 of the present embodiment is thus provided with the substrate supporters 24 and 25 protruding from the frame body 22 toward the substrate 31. The substrate supporters 24 and 25 support the substrate 31 within an influence area of the reaction force from the insertion of the terminals 64, 65 and at a position reserving an insulation gap to the connection portions 36, 37.

According to the above-mentioned configuration, the substrate supporters 24 and 25 can control, or limit, the stress of the substrate 31 that is generated on the connection portions 36 and 37 of the substrate 31, due to the insertion load of the connector terminals 64 and 65. Further, even when the frame member 20 is made with a conductive material, the connection portions 36 and 37, and the connector terminals 64 and 65 are prevented from short-circuiting the substrate supporters 24 and 25.

(3) The substrate supporters 24 and 25 of the present embodiment support the edge part 313 of the substrate 31.

In the above-mentioned configuration, on the edge part 313 of the substrate 31, it is difficult to dispose a copper wire/foil in a manufacture process of the substrate. When the substrate supporters 24 and 25 support the edge part 313 of the substrate 31, the edge part 313 where wiring is difficult is effectively used. In other words, other areas of the substrate 31, which are otherwise occupied (i.e., supported by the substrate supporters 24, 25), are now available for the wiring, by devising the supporting structure of the present embodiment. That is, the other areas may be used to implement the electronic components 41 to 48 on the substrate 31 by saving the supporter occupied part.

(4) The substrate supporter 24 of the present embodiment has the bottom part 245 arranged on one side of the connection portion 36, and the plurality of side parts 246 arranged on different sides to surround (i.e., to bind) the connection portion 36 in between when seen from the axial direction.

According to the above-mentioned configuration, the substrate supporter 24 can receive more effectively the reaction force (i.e., the stress) generated on or around the connection portion 36 on the substrate 31 due to the insertion load of the connector terminal 64. Therefore, bending of the substrate 31 is restricted.

Further, the connection portion 36 is not entirely surrounded by the substrate supporter 24, and the first main surface 311 of the substrate 31 may have a wiring that extends from the connection portion 36 toward the other part of the substrate 31.

(5) When seen from the axial direction, the substrate supporter 25 of the present embodiment circles an entire circumference of the connection portion 37.

According to the above-mentioned configuration, the substrate supporter 25 can receive more effectively the stress of the substrate 31 that is generated on or around the connection portion 37 due to the insertion load of the connector terminal 65. Therefore, bending of the substrate 31 is restricted.

Further, the scraps of metal part produced during the press-fitting of the connector terminal 65 to the connection portion 37 are enclosed in the substrate supporter 25, thereby preventing the scraps from scattering into other parts and from causing problems.

(6) In the present embodiment, the connection portions 36 and 37 of the substrate 31 are provided as the conductive layers 363 and 373 that cover an inside of the through holes 361 and 371 bored on the substrate 31, and the connector terminals 64 and 65 have the end parts 641 and 651 that are inserted into the through holes 361 and 371, and contact the conductive layers 363 and 373 in an elastically-deformable manner.

According to the above-mentioned configuration, the connection portions 36 and 37 of the substrate 31, and the connector terminals 64 and 65 that are inserted into the connection portions 36 and 37 are easily configurable.

(Second Embodiment)

Figure 10:
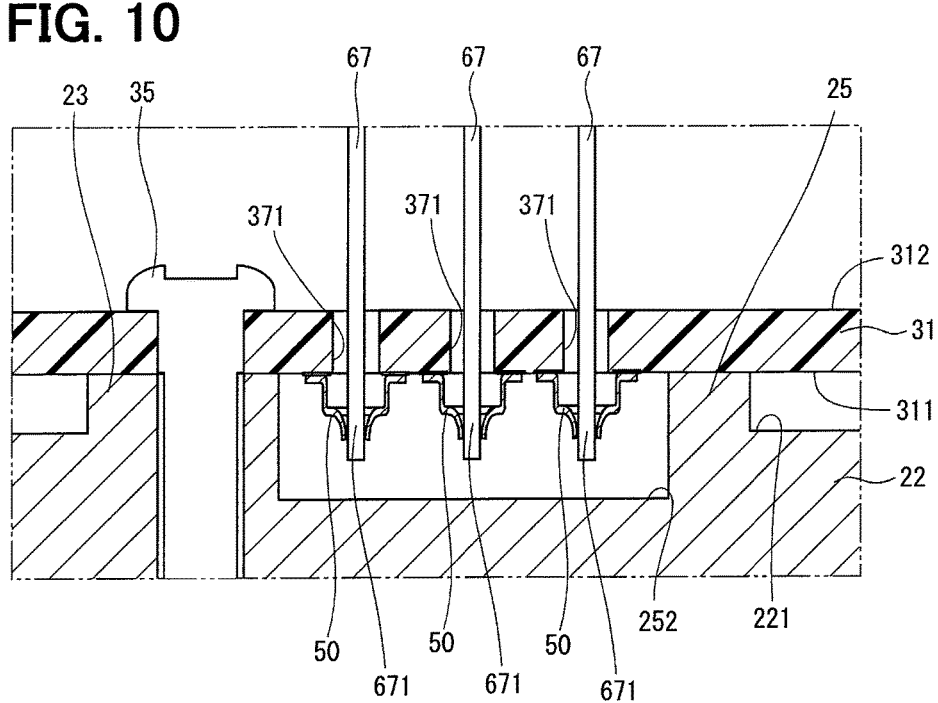
FIG. 10 is a cross-sectional view of the signal connector terminal and a signal connection portion in a second embodiment of the present disclosure.

The drive device in the second embodiment of the present disclosure is described based on FIG. 10.

The second embodiment is different from the first embodiment in the configuration of the connection portion into which the connector terminal is press-fitted. In FIG. 10, the signal connector terminal 67 and the signal connection portion 50 are shown. The description about the power supply connector terminal and the power supply connection portion respectively having the same configuration as the signal connector terminal and the signal connection portion is thus not provided in the following.

As shown in FIG. 10, the signal connection portion 50 is disposed on the first main surface 311 of the substrate 31, and is accommodated in the concavity 252 of the frame body 22.

An end part 671 of the signal connector terminal 67 has a linear shape, and is inserted into the through hole 371 on the substrate 31, and is press-fitted to the signal connection portion 50.

Figure 11:
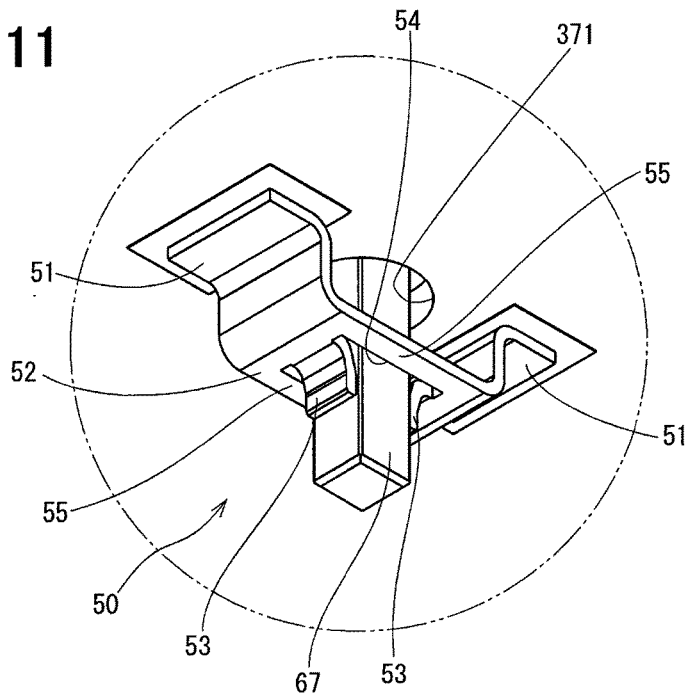
FIG. 11 is a perspective view expanding the signal connection portion for in the second embodiment of the present disclosure.

Hereafter, the configuration of the signal connection portion 50 is described with reference to FIG. 11. FIG. 11 is an expanded perspective view of one of the signal connection portions 50.

The signal connection portion 50 is made with a conductive metal etc., and has a pair of fixing parts 51, a convex part 52, and a pair of claws 53.

The pair of the fixing parts 51 is soldered to the substrate 31 for fixation on the substrate 31, and is connected to a wiring exposed on the substrate 31.

The convex part 52 is formed in a rectangular "U character shape," and has a space that is defined by the pair of fixing parts 52 and the substrate 31. The convex part 52 has an insertion hole 54 into which the signal connector terminal 67 is inserted.

The pair of claws 53 faces each other across the insertion hole 54 in between, and extends away from the substrate 31 on the convex part 52. The pair of claws 53 binds the signal connector terminal 67 from both sides by elastically contacting the signal connector terminal 67.

Two side parts 55 facing each other across the insertion hole 54 on the convex part 52 support the signal connector terminal 67 in between from both sides in a different direction that is different from a binding direction of the pair of claws 53.

According to the second embodiment having the above-described configuration, the cover member 60 is joined to the frame member 20 by bringing the cover member 60 closer along the axial direction to the frame member 20 on which the substrate 31 is fixed at the time of manufacture of the drive device 1, and the connector terminal 67 is press-fitted to the pair of claws 53. Thereby, the connector terminal 67 establishes a connection to the substrate 31 via the signal connection portion 50.

Therefore, in the second embodiment, just like the first embodiment, even when the connection portion of the substrate 31 and the connector terminal 67 are shielded to be invisible by the cover member 60 from the outside, the drive device 1 is easily assembled and manufactured, thereby enabling a reduction of the number of work steps for the manufacturing of the drive device 1.

Figure 12:
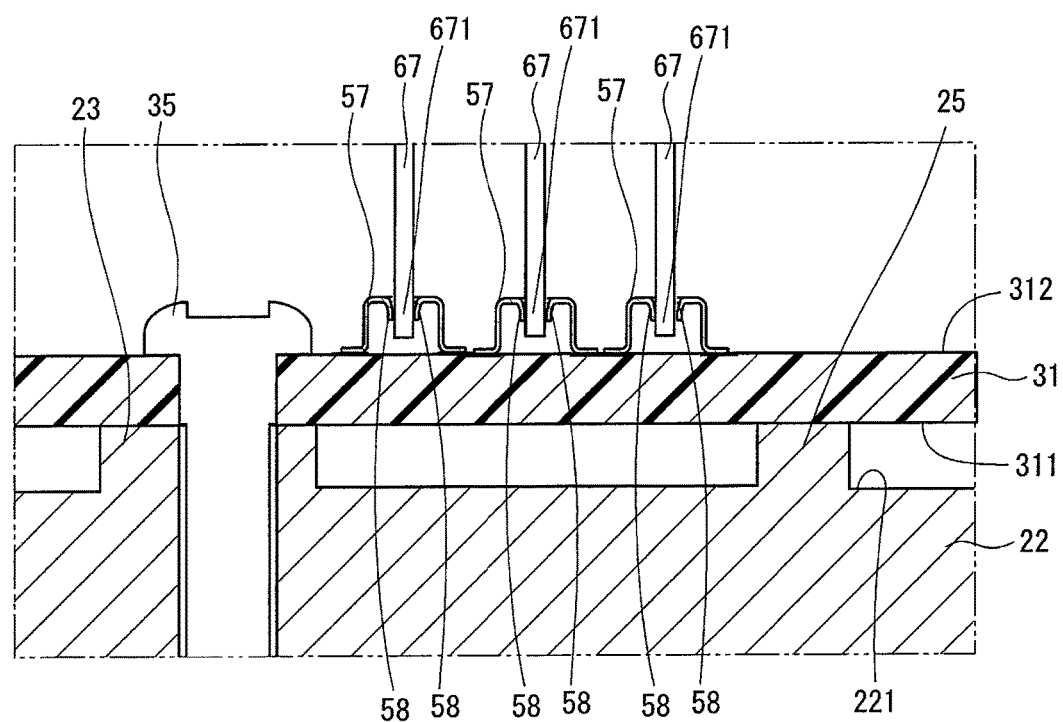
FIG. 12 is a cross-sectional view of a modification of the second embodiment of the present disclosure.

Further, as a modification of the second embodiment, the signal connection portion may have a shape of 57 that is shown in FIG. 12. The signal connection portion 57 is a terminal disposed on the substrate 31 (i.e., on the second main surface 312 of the substrate 31), and has substantially the same configuration as the signal connection portion 50 other than a pair of claws 58 that respectively extend toward the substrate 31.

In such modification, the substrate 31 does not have to have the through hole 371. Further, the concavity 252 does not have to be formed in an inside of the substrate supporter 25 on the frame member 20.

(Other Embodiments)

(a) Substrate Supporter

In other embodiments other than the above embodiments, the frame member 20 does not have to have the substrate supporters 24 and 25.

The shape of the substrate supporters 24 and 25 is not restricted to what is shown in the above-mentioned embodiments. For example, the shape of the supporter 24 and the shape of the supporter 25 described in the above-mentioned embodiments may be reversed. Further, both of the substrate supporters 24 and 25 may be divided into two parts to be placed on both sides of the connection portions 36-38, or may be placed only on one side of the connection portions 36-38.

(b) Substrate Fixing Part

In the above-mentioned embodiments, the substrate pedestal 23 includes a plurality of convex shape parts. However, the substrate pedestal 23 may take any shape as long as it reserves a space between the frame body 22 and the substrate 31 when the substrate 31 is fixedly disposed thereon.

(c) Cover Member and Connector

In other embodiments other that the above embodiments, the cover member 60 and the connectors 62 and 63 may be provided as separate members, and the connectors 62, 63 may be fixedly disposed on the cover member 60.

In other embodiments other than the above, the number of the signal connector 63 is not necessarily restricted to two. That is, the number of the connector 63 may be one, or three or more. Further, the number of the connector terminals 64 and 65 may be at least one. Further, when the power supply path or the signal path does not pass the cover member 60, either the power supply connector 62 or the signal connector 63 may be provided on the cover member 60.

The power supply connector 62 and the signal connector 63 may protrude from the cover member 60 along the axial direction, or along the radius direction.

(d) Motor

The motor of the present disclosure may be applied not only to the three-phase alternate current motor as shown in the above-mentioned embodiment, but also to the direct-current motor. Further, the number of the phases may be four or more. Further, the number of the winding systems may be two, three, or more.

Although the present disclosure has been described in connection with preferred embodiment thereof with reference to the accompanying drawings, it is to be noted that various changes and modifications will become apparent to those skilled in the art, and such changes, modifications, and summarized scheme are to be understood as being within the scope of the present disclosure as defined by appended claims.

What is claimed is:

1. A drive device comprising:
   a motor having a stator on which a winding is wound, a rotor rotatable relative to the stator, and a shaft rotatable together with the rotor;
   a substrate disposed on one axial end part of the motor perpendicular to an axial direction of the motor, and having electronic components and a plurality of conductive connection portions disposed on the substrate to control a power supply to the winding, wherein the substrate has (i) a frame member facing surface and (ii) a cover member facing surface opposite the frame member facing surface;
   a frame member having a frame body that is disposed between the motor and the substrate with a gap interposed in between the frame body and the frame member facing surface of the substrate and a substrate pedestal that protrudes from the frame body toward the frame member facing surface of the substrate on which the substrate is fixedly disposed;
   a cover member disposed to cover the cover member facing surface of the substrate, the cover member having an outer periphery that extends along the axial direction and configured to connect to the frame body;
   a power supply connector disposed on the cover member for a connection to an external device and having a power supply connector terminal formed on the cover member that extends axially through the power supply connector of the cover member, the power supply connector terminal configured to connect directly to the substrate at one of the plurality of conductive connection portions to form a power supply press-fit connection;

a signal connector disposed on the cover member for a connection to an external device and having a signal connector terminal formed on the cover member that extends axially through the signal connector of the cover member, the signal connector terminal configured to connect directly to the substrate at another of the plurality of conductive connection portions to form a signal press-fit connection, wherein when the outer periphery of the cover member connects to the frame body of the frame member,
- the power supply connector terminal engages the one of the plurality of conductive connection portions to form the power supply press-fit connection, and
- the signal connector terminal engages the other of the conductive connection portions to form the signal press-fit connection.

2. The drive device of claim 1, wherein
a substrate supporter is provided on the frame body to extend toward the substrate, and
the substrate supporter supports the substrate at a position (i) that is separated from the at least one of the plurality of conductive connection portions with an insulation gap, and (ii) that is within a reaction force influencing range from the at least one of the plurality of conductive connection portions when the power supply terminal or the signal terminal is press-fitted into the at least one of the plurality of conductive connection portions of the substrate.

3. The drive device of claim 2, wherein
the substrate supporter supports an edge part of the substrate.

4. The drive device of claim 2, wherein
the substrate supporter includes a bottom part and a plurality of side parts, wherein the bottom part is arranged on one side of the at least one of the plurality of conductive connection portions in an axial view of the motor, and
the at least one of the plurality of conductive connection portions is disposed between the plurality of side parts, and wherein
the substrate supporter is configured to receive an insertion force of the power supply connector terminal or the signal connector terminal into the at least one of the plurality of conductive connection portions and to limit bending of the substrate.

5. The drive device of claim 2, wherein
the substrate supporter is arranged to surround an entire periphery of the at least one of the plurality of conductive connection portions in an axial view of the motor, the substrate supporter configured to receive an insertion force of the power supply connector terminal or the signal connector terminal into the at least one of the plurality of conductive connection portions and to limit bending of the substrate.

6. The drive device of claim 1, wherein
an end part of the power supply connector terminal and the signal connector terminal includes a bore hole; and wherein
the plurality of conductive connection portions include a through hole extending through the substrate and having an inner surface, the inner surface of the at least one through hole covered with an electrically conductive layer, and wherein power supply connector terminal is configured to elastically deform when the end part of the power supply connector terminal is inserted into the through hole of one of the plurality of conductive connection portions and to contact the inner surface of the through hole of the one of the plurality of conductive connection portions to form the power supply press-fit connection, and wherein the end part of the signal connector terminal is configured to elastically deform when the end part of the signal connector terminal is inserted into the through hole of another of the plurality of conductive connection portions and to contact the inner surface of the through hole of the other of the plurality of conductive connection portions to form the signal press-fit connection.

7. The drive device of claim 1, wherein
at least one of the plurality of conductive connection portions include
- a pair of side portions that extend from and are in connection with the substrate,
- a convex portion that extends between and is in connection with each of the side portions, the convex portion including a hole with a pair of opposing claws positioned on sides of the hole, the pair of opposing claws elastically deformable, and wherein each of the power supply connector terminal and the signal connector terminal includes an end part that is configured to be positioned between the pair of opposing claws, and wherein when the end part of the power supply connector terminal is positioned between the pair of opposing claws of one of the plurality of conductive connection portions, the pair of opposing claws elastically deforms and remains in contact with the end part of the power supply connector terminal to form the power supply press-fit connection, and wherein when the end part of the signal connector terminal is positioned between the pair of opposing claws of another of the plurality of conductive connection portions, the pair of opposing claws elastically deforms and remains in contact with the end part of the signal connector terminal to form the signal press-fit connection.

8. The drive device of claim 1, wherein
the cover member, the power supply connector, and the signal connector are all formed as one body from a resin material.

9. The drive device of claim 1, wherein
one or more capacitors are disposed on the cover member facing surface.

10. The drive device of claim 1, wherein
all of the power supply connector terminal extends axially straight without bending, and wherein
all of the signal connector terminal extends axially straight without bending.

11. The drive device of claim 10, wherein
one or more capacitors are disposed centrally on the cover member facing surface near a center of the substrate, and wherein
the plurality of conductive connection portions are disposed on the cover member facing surface away from the center of the substrate near edges of the substrate.

12. A drive device comprising:
a motor having a stator on which two winding wire groups are wound, each of the winding wire groups forming a three-phase circuit with three coils, a rotor rotatable relative to the stator, and a shaft rotatable together with the rotor;
a substrate disposed on one axial end part of the motor perpendicular to an axial direction of the motor, and having:
electronic components,
a plurality of connection terminals,
a power supply connection portion, and
a signal connection portion
disposed on the substrate to control a power supply to the at least one winding, wherein the substrate has (i) a frame member facing surface and (ii) a cover member facing surface opposite the frame member facing surface;
a frame member having a frame body that is disposed between the motor and the substrate with a gap interposed in between the frame body and the substrate and a substrate pedestal that protrudes from the frame body toward the substrate on which the substrate is fixedly disposed;
a cover member disposed to cover the cover member facing surface of the substrate, the cover member having an outer periphery that extends along the axial direction and configured to connect to the frame body;
a plurality of motor lines, one of the plurality of motor lines extending from each of the three coils of the two winding wire groups, each of the plurality of motor lines extending axially from one of the two winding wire groups and configured to engage one of the plurality of connection terminals;
a power supply connector disposed on the cover member for a connection to an external device and having a power supply connector terminal formed on the cover member that extends axially through the power supply connector of the cover member, the power supply connector terminal configured to connect directly to the substrate at the power supply connection portion to form a power supply press-fit connection; and
a signal connector disposed on the cover member for a connection to an external device and having a signal connector terminal formed on the cover member that extends axially through the signal connector of the cover member, the signal connector terminal configured to connect directly to the substrate at the signal connection portion to form a signal press-fit connection, wherein
when the outer periphery of the cover member connects to the frame body of the frame member,
the power supply connector terminal engages the power supply connection portion to form the power supply press-fit connection, and
the signal connector terminal engages the signal connection portion to form the signal press-fit connection.

13. The drive device of claim 12, wherein the two winding wire groups of the stator include a first winding group wound on one side of the stator and a second winding group wound on another side of the stator, the first winding group positioned diametrically opposite to the second winding group on the stator, and wherein
three connection terminals are disposed at a first connection position on the substrate corresponding to a position of the first winding wire group, the motor lines extending from the first winding wire group configured to form press-fit connections with the connection terminals at the first connection position, and wherein
three connection terminals are disposed at a second connection position on the substrate corresponding to a position of the second winding wire group, the motor lines extending from the second winding wire group configured to form press-fit connections with the connection terminals at the second connection position, and wherein
the first connection position and the second connection position are positioned on opposite sides of the substrate and on a same surface of the substrate.

14. The drive device of claim 12, wherein
the signal connector terminal is configured to transmit an electrical signal to the substrate; and
the power supply connector terminal is configured to transmit electrical power to the substrate.

15. A drive device comprising:
a motor having a stator on which a winding is wound, a rotor rotatable relative to the stator, and a shaft rotatable together with the rotor;
a substrate disposed on one axial end part of the motor perpendicular to an axial direction of the motor, the substrate having
a cover member facing surface,
a frame member facing surface opposite the cover member facing surface,
a plurality of through holes that extend from the cover member facing surface through the substrate to the frame member facing surface, and
a plurality of conductive connection portions disposed on the frame member facing surface, at least one of the plurality of conductive connection portions extends across at least one of the plurality of through holes,
a frame member having a frame body that is disposed between the motor and the substrate with a gap interposed in between the frame body and the substrate and a substrate pedestal that protrudes from the frame body toward the substrate on which the substrate is fixedly disposed;
a cover member configured to cover the cover member facing surface of the substrate, the cover member having an outer periphery that extends along the axial direction and configured to connect to the frame body;
a power supply connector disposed on the cover member for a connection to an external device and having a power supply connector terminal formed on the cover member that extends axially through the power supply connector of the cover member, the power supply connector terminal configured to connect directly to the substrate at one of the plurality of conductive connection portions to form a power supply press-fit connection; and
a signal connector disposed on the cover member for a connection to an external device and having a signal connector terminal formed on the cover member that extends axially through the signal connector of the cover member, the signal connector terminal configured to connect directly to the substrate at another of the plurality of conductive connection portions to form a signal press-fit connection, wherein
when the outer periphery of the cover member connects to the frame body of the frame member,
the power supply connector terminal extends through one of the plurality of through holes on the substrate and engages one of the plurality of conductive connection portions that extends across the one of the plurality of through holes to form the power supply press-fit connection, and the signal connector terminal extends through another of the plurality of through holes on the substrate and engages another of the plurality of conductive connection portions that extends across the other of the plurality of through holes to form the signal press-fit connection.

16. The drive device of claim 15, wherein at least one of the plurality of conductive connection portions includes a pair of side portions that extend from and are in connection with the substrate, a convex portion that extends between and is in connection with each of the side portions, the convex portion including a hole with a pair of opposing claws positioned on sides of the hole, the pair of opposing claws elastically deformable, and wherein each of the power supply connector terminal and the signal connector terminal includes an end part that is configured to be positioned between the pair of opposing claws, and wherein when the end part of the power supply connector terminal is positioned between the pair of opposing claws of one of the plurality of conductive connection portions, the pair of opposing claws elastically deforms and remains in contact with the end part of the power supply connector terminal to form the power supply press-fit connection, and wherein when the end part of the signal connector terminal is positioned between the pair of opposing claws of another of the plurality of conductive connection portions, the pair of opposing claws elastically deforms and remains in contact with the end part of the signal connector terminal to form the signal press-fit connection.

* * * * *